US006812909B1

(12) United States Patent
Crossland

(10) Patent No.: US 6,812,909 B1
(45) Date of Patent: Nov. 2, 2004

(54) ACTIVE SEMICONDUCTOR BACKPLANES

(75) Inventor: William A Crossland, Cambridge (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 10/085,140

(22) Filed: Mar. 1, 2002

Related U.S. Application Data

(63) Continuation of application No. 09/868,229, filed as application No. PCT/GB99/04279 on Dec. 16, 1999, now abandoned.

(30) Foreign Application Priority Data

Dec. 19, 1998 (GB) .............................................. 9827901

(51) Int. Cl.⁷ ................................................. G09G 3/36
(52) U.S. Cl. ............................... 345/89; 345/97; 345/98
(58) Field of Search ............................ 345/89, 97, 98; 257/186, 296, 316, 459

(56) References Cited

U.S. PATENT DOCUMENTS

| 4,816,890 A | * | 3/1989 | Ouchi et al. ................. 257/186 |
| 5,214,496 A | * | 5/1993 | Sunami et al. ............... 257/296 |
| 5,223,919 A | * | 6/1993 | Whight et al. ............... 257/459 |
| 5,471,225 A | * | 11/1995 | Parks ........................... 345/98 |
| 5,748,451 A | * | 5/1998 | Thompson et al. .......... 361/788 |
| 6,512,263 B1 | * | 1/2003 | Yuan et al. ................... 257/316 |
| 6,570,550 B1 | * | 5/2003 | Handschy et al. ............ 345/89 |

\* cited by examiner

Primary Examiner—David Nelms
Assistant Examiner—Dao H. Nguyen
(74) Attorney, Agent, or Firm—Nixon & Vanderhye P.C.

(57) ABSTRACT

Relates to constructions of a backplane which comprises an array of addressable active elements 52 on a semiconductor substrate 51 for selectively energizing respective first electrodes 65 of the array, for example in a liquid crystal matrix cell. To reduce photo-induced degradation of images produced thereby (a) at least part of the region beneath a first electrode is adapted to act as a capacitor, for example a depletion layer 66 acting as a reverse biased diode, and/or (b) substantially the whole of each active element is covered by a metallic conductor (59, 60—coupled to row and column conductors). In a variant of (b) the array of active elements may covered by an insulating layer, and each active element is connected to a metal electrode on the insulating layer, the array of said metal electrodes thus formed covering more than 65% of the area of said array.

15 Claims, 5 Drawing Sheets

ACTIVE SEMICONDUCTOR BACKPLANES

This application is a continuation of U.S. application Ser. No. 09/868,229 filed Jun. 15, 2001, now abandoned which is a 371 of national stage application No. PCT/GB97/04279 filed Dec. 16, 1999.

BACKGROUND OF THE INVENTION

1. Field of the Invention

The present invention relates to active semiconductor backplanes suitable for use with a spaced opposed substrate, commonly a counterelectrode, to form a cell, and to devices comprising such backplanes.

2. Discussion of Prior Art

The device which is particularly described in this specification in connection with a preferred embodiment is a spatial light modulator in the form of a smectic liquid crystal layer disposed between an active semiconductor backplane and a common front electrode. It was developed in response to a requirement for a fast and, if possible, inexpensive, spatial light modulator comprising a relatively large number of pixels with potential application not only as a display device, but also for other forms of optical processing such as correlation and holographic switching. Our copending International Patent Applications even filing and priority dates (PCT/GB99/04285, U.S. Ser. No. 09/868,219, priority GB9827952.4; PCT/GB99/04286 and PCT/GB99/04276, U.S. Ser. No. 09/868,239 and U.S. Ser. No. 09/868,220, both priority GB9827965.6; PCT/GB99/04282, U.S. Ser. No. 09/446,325, priority GB9827900.3; PCT/GB99/04274, U.S. Ser. No. 09/868,218, priority GB9827964.9; PCT/GB99/04275, U.S. Ser. No. 09/868,217, priority GB9827945.8; and PCT/GB99/04260 and PCT/GB99/04277, U.S. Ser. No. 09/868,241 and U.S. Ser. No. 09/868,242, both priority GB 9827944.1) relate to other inventive aspects associated with the spatial light modulator.

During the course of development of the spatial modulator, a series of problems were encountered and dealt with, and the solutions to these problems (whether in the form of construction, function or method) are not necessarily restricted in application to the embodiment, but will find other uses. Thus not all of the aspects of the present invention are limited to liquid crystal devices, nor to spatial light modulators.

Nevertheless, it is useful to commence with a discussion of the problems encountered in developing the embodiment to be described later.

The liquid crystal phase has been recognised since the last century, and there were a few early attempts to utilise liquid crystal materials in light modulators, none of which gave rise to any significant successful commercial use. However, towards the end of the 1960's and in the 1970's, there was a renewed interest in the use of liquid crystal materials in light modulating, with increasing success as more materials, and purer materials became available, and as technology in general progressed.

Generally speaking, this latter period commenced with the use of nematic and cholesteric liquid crystal materials. Cholesteric liquid crystal materials found use as sensors, principally for measuring temperature or indicating a temperature change, but also for responding to, for example, the presence of impurities. In such cases, the pitch of the cholesteric helix is sensitive to the parameter to be sensed and correspondingly alters the wavelength at which there is selective reflection of one hand of circularly polarised light by the helix.

Attempts were also made to use cholesteric materials in electro-optic modulators, but during this period the main thrust of research in this area involved nematic materials. Initial devices used such effects as the nematic dynamic scattering effect, and increasingly sophisticated devices employing such properties as surface induced alignment, the effect on polarised light, and the co-orientation of elongate dye molecules or other elongate molecules/particles, came into being.

Some such devices used cells in which the nematic phase adopted a twisted structure, either by suitably arranging surface alignments or by incorporating optically active materials in the liquid crystal phase. There is a sense in which such materials resemble cholesteric materials, which are often regarded as a special form of the nematic phase.

Initially, liquid crystal light modulators were in the form of a single cell comprising a layer of liquid crystal material sandwiched between opposed electrode bearing plates, at least one of the plates being transparent. The thickness of the liquid crystal layer in nematic cells is commonly around 20 to 100 microns, and there is a correspondingly small unit capacitance associated with a nematic liquid crystal cell. Furthermore, the switching time from a wholly "OFF" state to a wholly "ON" state tends to be rather long, commonly around a millisecond. Relaxation back to the "OFF" state can be somewhat longer, unless positively driven, but the "OFF" state is the only stable one.

At the same time, electro-optic nematic devices comprising a plurality of pixels were being devised. Initially, these had the form of a common electrode on one side of a cell and a plurality of individually addressable passive electrodes on the other side of the cell (e.g. as in a seven-segment display), or, for higher numbers of pixels, intersecting passive electrode arrays on either side of the cell, for example row and column electrodes which were scanned. While the latter arrangements provided considerable versatility, there were problems associated with cross-talk between pixels.

The situation was exacerbated when analogue (grey scale) displays were required by analogue modulation of the applied voltage, since the optical response is non-linearly related to applied voltage. Addressing schemes became relatively complicated, particularly if dc balance was also required. Such considerations, in association with the relative slowness of switching of nematic cells, have made is difficult to provide real-time video images having a reasonable resolution.

Subsequently, active back-plane devices were produced. These comprise a back plane comprising a plurality of active elements, such as transistors, for energising corresponding pixels. Two common forms are thin film transistor on silica/glass backplanes, and semiconductor backplanes. The active elements can be arranged to exercise some form of memory function, in which case addressing of the active element can be accelerated compared to the time needed to address and switch the pixel, easing the problem of displaying at video frame rates.

Active backplanes are commonly provided in an arrangement very similar to a dynamic random access memory (DRAM) or a static random access memory (SRAM). At each one of a distributed array of addressable locations, a SRAM type active backplane comprises a memory cell including at least two coupled transistors arranged to have two stable states, so that the cell (and therefore the associated liquid crystal pixel) remains in the last switched state until a later addressing step alters its state. Each location electrically drives its associated liquid crystal pixel, and is bistable per se, i.e. without the pixel capacitance. Power to drive the pixel to maintain the existing switched state is obtained from busbars which also supply the array of SRAM locations. Addressing is normally performed from peripheral logic via orthogonal sets (for example column and row) addressing lines.

In a DRAM type active backplane, a single active element (transistor) is provided at each location, and forms, together with the capacitance of the associated liquid crystal pixel, a charge storage cell. Thus in this case, and unlike a SRAM backplane, the liquid crystal pixels are an integral part of the DRAM of the backplane. There is no bistability associated with the location unless the liquid crystal pixel itself is bistable, and this is not normally the case so far as nematic pixels are concerned. Instead, reliance is placed on the active element providing a high impedance when it is not being addressed to prevent leakage of charge from the capacitance, and on periodic refreshing of the DRAM location.

Thin film transistor (TFT) backplanes comprise an array of thin film transistors distributed on a substrate (commonly transparent) over what can be a considerable area, with peripheral logic circuits for addressing the transistors, thereby facilitating the provision of large area pixellated devices which can be directly viewed. Nevertheless, there are problems associated with the yields of the backplanes during manufacture, and the length of the addressing conductors has a slowing effect on the scanning. When provided on a transparent substrate, such as of glass, TFT arrays can actually be located on the front or rear surface of a liquid crystal display device.

In view of their overall size, the area of the TFT array occupied by the transistors, associated conductors and other electrical elements, e.g. capacitors is relatively insignificant. There is therefore no significant disadvantage in employing the SRAM configuration as opposed to the DRAM configuration. This sort of backplane thus overcomes many of the problems associated with slow switching times of liquid crystal pixels.

Generally, the active elements in TFT backplanes are diffusion transistors and the like as opposed to FETS, so that the associated impedances are relatively low and associated charge leakage relatively high in the "OFF" state.

Semiconductor active backplanes are limited in size to the size of semiconductor substrate available, and are not suited for direct viewing with no intervening optics. Nevertheless their very smallness aids speed of addressing of the active elements. This type of backplane commonly comprises FETs, for example MOSFETs or CMOS circuitry, with associated relatively high impedances and relatively low associated charge leakage in the "OFF" state.

However, the smallness also means that the area of the overall light modulation (array) area occupied by the transistors, associated conductors and other electrical elements, e.g. capacitors can be relatively significant, particularly in the SRAM type which requires many more elements than the DRAM type. Being opaque to visible light, a semiconductor backplane would provide the rear substrate of a light modulator or display device.

In contrast to the type of RAM associated with computing, the pixel circuits, and more significantly the pixel transistors, are often at least partially exposed to light. This can lead to problems, especially with DRAM type backplanes where the pixels are part of the DRAM circuit, including photo-induced conductivity and charge leakage.

Smectic Liquid Crystal Electro-Optic Cells

At a later period still, substantial development occurred in the use of smectic liquid crystals. These have potential advantages over nematic phases insofar as their switching speed is markedly greater, and with appropriate surface stabilisation the ferroelectric smectic C phases should provide devices having two stable alignment states, i.e. a memory function.

The thickness of the layer of liquid crystal material in such devices is commonly much smaller than in the corresponding nematic devices, normally being of the order of a few microns at most. In addition to altering the potential switching speed, this increases the unit capacitance of a pixel, easing the function of a DRAM active backplane in retaining a switched state at a pixel until the next address occurs.

However, as the thickness of the liquid crystal approaches the thicknesses associated with the underlying structure of the backplane and with any possible deformation of the liquid crystal cell structure by flexing or other movement of the substrates, problems arise, for example as to the uniformity of response across the pixel area, and the capability for short circuiting across the cell thickness.

In the smectic liquid crystal phase, the molecules exhibit positional order ("layers") in addition to the orientational order exhibited by the cholesteric and nematic phases. There are a number of different smectic sub-phases which differ in the orientational order within the overall structure of the smectic layers, the most common being the smectic A phase (SmA) and the smectic C phase (SmC).

The common alignment for smectic materials is planar (molecules generally parallel to the major cell surfaces) with the smectic layers normal to the plane of the cell, as this permits the field to be applied across the cell thickness. It is possible to obtain homeotropic alignment with the smectic layers in the cell plane, and such a device could provide a fast refractive index modulator. However, in order to apply appropriate electric fields for switching, very small electrode gaps are required and therefore such devices tend to have very small active areas, and as a consequence this type of device is relatively uncommon.

In the smectic A phase the director is normal to the plane of the layers. Application of an electric field perpendicular to the director causes the latter to tilt about an axis parallel to the applied field by an amount approximately linearly dependent of field strength, making it possible to achieve analogue grey scale modulation. Polarisation of the light is affected, so that intensity or phase modulation may be achieved, and since the rotation of the director is in the plane of the cell, normally incident light is always perpendicular to the optic axis of the material. Coupled with the thinness of the cell, this leads to improved viewing angles for such devices. This effect, called the electroclinic effect, is extremely fast, switching times down to around 100 nanoseconds having been observed.

In the smectic C phase, the director forms a constant ("tilt") angle with the plane of the smectic layers. The tilt angle depends on the material and the temperature, and defines a cone with its tip on the smectic layer and its axis normal to the layer, all possible positions of the director lying on the cone surface. In the bulk of a chiral smectic C phase (SmC*) the director precesses from layer to layer as in a helix.

In the chiral smectic C phase, liquid crystal materials are ferro-electric, having a permanent dipole, sometimes termed spontaneous polarisation ($P_s$). In the bulk material, $P_s$ rotates in the plane of the layer as the director precesses, so no net effect is observable. Bulk ferro-electricity can be observed if the precession is suppressed, either by surface stabilisation of the director positions such that only the two orientations of director which lie in the plane of the device are possible, and/or by back-doping with a chiral material of the opposite hand.

Smectic C* materials can be broadly divided into two classes known as high and low tilt materials respectively. Class I materials have the phase sequence isotropic—nematic—smectic A*—smectic C*, and tend to be low tilt materials, having tilt angles generally grouped up to around 22.5° (cone angle of 45°); class II materials have the phase sequence isotropic—nematic—smectic C*, and tend to be high tilt materials with greater tilt angles. Materials with a cone angle greater than 75° are rare, although for holographic applications, which require phase modulation, a cone angle of 90° would be ideal.

With low tilt materials, the smectic layers are inclined relative to the cell surface rather than at right angles, such that the director cone has a tilted axis and its surface is tangential to the cell surface. For high tilt materials the cone axis is normal to the cell surface.

When the structure is surface stabilised, then in theory, at least for Class I materials there is no preference between the two states of a low tilt material and a bistable structure should result. Surface stabilisation can be achieved simply by making the layer in the cell thin. The two states will have different effects on polarised light, and so can provide intensity or phase modulation. In practice, it is very difficult or impossible to obtain true bistability, especially on silicon backplanes and there will a slight preference for one state over the other. Nevertheless, this should give rise to relatively long relaxation times.

For high tilt materials, the two states are not equal, and one state is preferred over the other, so that there is monostability in the absence of any other factor. The two states are such that phase modulation of light may be obtained, and, indirectly, intensity modulation, e.g. in holographic applications. Both high and low tilt materials may be used in the spatial light modulator of the invention.

Stability/Relaxation

The presence of the spontaneous polarisation, and its realignment as the liquid crystal molecules realign under the influence of an electric field, leads to a significant additional current or charge flow during realignment, e.g. between electrodes either side of a smectic layer. A pixel of area A will consume a charge of 2AP, during switching. This factor is particularly important when pixel switching is controlled by DRAM type of active backplane, when pixel capacitance and $P_s$ become important design parameters. It should also be noted that charge consumption reduces the field across the electrodes in such devices if the addressing pulse is insufficiently long to accommodate pixel switching, as in the present preferred embodiment.

As has already been noted, the use of the backplanes described herein is not limited to liquid crystal devices. However, these backplanes are particularly suited for use in the manufacture of liquid crystal devices. Again, although it is possible to employ nematic or cholesteric materials in such devices, it is preferred to employ smectic materials because of their faster switching action. Also, in the case of using a DRAM type active backplane (this does not apply when the backplane is the SRAM type since power/current can be continuously applied to each pixel), the ability to extend the relaxation time, or even to obtain a bistable effect, once the pixel has been placed in the desired state.

One advantage of having a fast switching time in the case where relaxation occurs lies in the increase of the fraction of the pixel repeat address period usable for viewing time. Another advantage, particularly where optical processing is concerned is the increase in data throughput.

Pixel Structure—Switching and Address Times

When using a SRAM type backplane to switch a capacitive element the time necessary to address the location on the backplane can be as small as is necessary to switch that location, regardless of whether the capacitive element has responded. The location is always coupled to the power supply, and can continue to supply power (current/voltage) to the capacitive element after the addressing pulse has ceased.

By contrast, power is supplied to a capacitive element from a DRAM location only while addressing is taking place, after which the active element (transistor) is turned off. If the addressing pulse is insufficiently long for transfer of the requisite amount of charge, the capacitive element is incompletely switched. This is likely to occur, for example, when the capacitive element includes ferroelectric material, as in some smectic liquid crystal cells, and the addressing time is short, for example in a large scale array.

SUMMARY OF THE INVENTION

One solution is to provide an additional "slug" capacitance which is rapidly charged during the addressing pulse and so can provide a reservoir of charge while the capacitive element switches over a longer time period.

In a first aspect the invention provides a semiconductor active backplane including an array of addressable active elements on a semiconductor substrate for selectively energising respective first electrodes of the array, wherein at least part of the region beneath a said first electrode is formed as a depletion region whereby in use it acts as a reverse biassed capacitative diode characterised in that at least one charge trapping implant is provided adjacent but spaced from said depletion region.

In a second closely related aspect the invention provides a semiconductor active backplane including an array of addressable active elements on a semiconductor substrate for selectively energising respective first electrodes of the array, wherein at least part of the region beneath a said first electrode is formed as a depletion region whereby in use it acts as a reverse biassed capacitative diode characterised in that a guard ring is provided over or around the periphery of said depletion region to prevent or hinder charge carriers from crossing between the depletion region and the rest of the substrate.

In a third aspect the invention provides a semiconductor active backplane including an array of addressable active elements on a semiconductor substrate for selectively energising respective first electrodes of the array, characterised in that at least part of the region beneath a said first electrode is provided by individual capacitor plates formed beneath the electrode, one coupled to the substrate and the outer coupled to the electrode.

The first second and third aspects of the invention are particularly useful where the active element comprises a single transistor as in a DRAM type backplane.

In U.S. Pat. No. 4,839,707 (Shields) part of a dielectric layer is employed as a capacitive region between a source region and a silicon substrate. The dielectric layer is insulating, and the construction does not involve two distinguishable capacitor plates below the addressable electrode, one coupled to the addressable electrode, the other coupled to the substrate, as in embodiments of the present invention.

In U.S. Pat. No. 5,537,234 (Williams et al) trench capacitors are formed in the rear surface of a semiconductor layer, which layer is adhered to a substrate and provides transistors in an array. The capacitors lie below addressable electrodes but they neither comprise depletion regions, nor act as reverse biassed diodes. Furthermore, the construction involves only one plate, as opposed to two individual electrodes, one coupled to an addressable electrode and one coupled to the substrate.

Electrostatic Stabilisation

Once the capacitive element has been switched, it is still necessary to maintain the element in its switched state, at least until it is energised again. Again SRAM type backplanes do this successfully by virtue of their continuous coupling to the power supply lines.

For DRAM type backplanes, it is necessary to note that the charge consumption which occurs when a pixel is switched in one direction gives rise to a corresponding generation of charge when the pixel switches in the other direction. Therefore, if a switched pixel is completely electrically isolated, charge cannot flow and the pixel cannot relax. In operation of a DRAM type array, this may be effected by turning off all the transistors of the array, and in the preferred embodiment this is made possible by applying a global reset signal NRAR to the row scanners.

In practice, charge leakage cannot be completely eliminated, and so relaxation will occur, but over an extended period. A common cause of charge leakage is photoconductivity associated with the slug capacitance mentioned earlier and/or photoconductive or other leakage currents in the associated switching transistor of the DRAM array. This is particularly marked with DRAM type backplanes for optical use, where incident illumination can penetrate directly or indirectly to the underlying backplane structure, thereby causing photoconduction.

Electrical isolation is thus a useful but imperfect tool for prolonging relaxation times. It will be appreciated that whether a long relaxation time is achieved through an appropriate choice of material and cell design, or by electrical isolation, the important factor is that sufficient time can be allowed between successive addressings of any pixel for it to be maintained essentially in its desired state. Particularly in the case of DRAM type backplanes it is important that the design is such that charge leakage is minimised.

Thus in a fourth aspect the invention provides a semiconductor active backplane including an array of addressable active elements on a semiconductor substrate for energising respective first electrodes, and first and second orthogonal sets of addressing conductors, a respective pair of addressing conductors, one from each set, being associated with the addressing of a corresponding active element, characterised in that substantially the whole of each active element is covered by a said addressing conductor in the form of a metallic conductor. In a fifth closely related aspect, substantially the whole of each element is covered by a said pair of addressing conductors in the form of metallic conductors. In one embodiment of the fifth aspect the active element is sited below the crossover between row and column conductors.

In all the above aspects of the invention where each said active element is connected to a metal electrode on said insulating layer, the array of said metal electrodes thus formed preferably covers more than 65%, and more preferably more than 80%, of the area of said array.

It may be possible to regard the type of construction of the certain aspects of the invention as being disclosed with respect to thin film transistor (TFT) array active backplanes; of which the following are exemplary disclosures—EP 0762184 (Sharp KK); EP 0708356 (Sony); EP 0603866 (Sony); EP 0542579 (Sharp KK); U.S. Pat. No. 5,777,703 (Nishikawa); U.S. Pat. No. 5,691,782 (Nishikawa); U.S. Pat. No. 5,414,283 (den Boer).

Similarly EP 0877283 (Sanyo); EP 0793135 (Citizen Watch); EP 0752611 (OIS Optical Imaging Systems, Inc); and EP 0685757 (Matsushita) might be considered exemplary disclosures of thin film arrays in which an electrode is covered by an insulating film through which a connection is made to a larger reflective conductor over the insulating film.

Nevertheless, there are very real differences between TFT arrays and active semiconductor backplanes, not the least of which is that TFT arrays are much larger and transparent. It is believed that the effects of incident light on the transistors or other active elements in active semiconductor backplanes from has not heretofore been considered or even recognised, and that as a result no positive steps have been taken to protect such elements in the manners now proposed.

BRIEF DESCRIPTION OF THE DRAWINGS

Further features and advantages of the invention can be derived from a consideration of the appended claims, to which the reader is referred, and of the following description of an embodiment of the invention made with reference to the accompanying drawings, in which:

DETAILED DISCUSSION OF THE DRAWINGS

Figure 1:
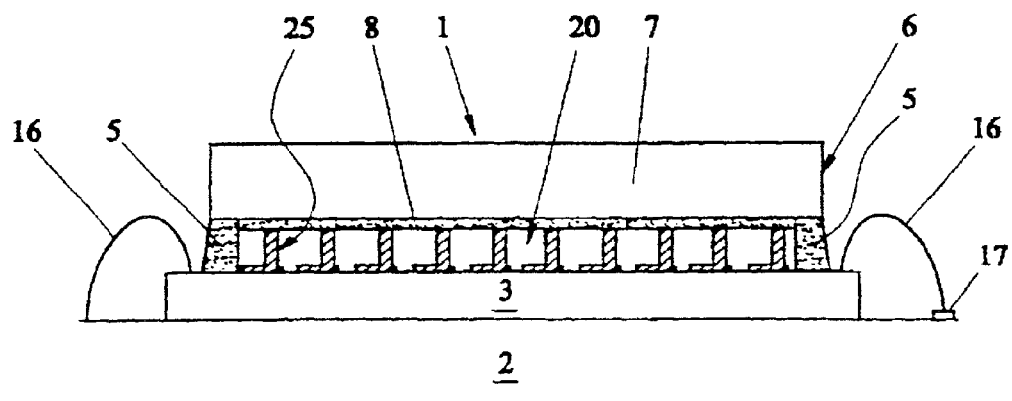
FIG. 1 shows in schematic cross-sectional view a liquid crystal cell which incorporates an active backplane and is mounted on a substrate.

FIG. 1 shows in schematic cross-sectional view a liquid crystal cell 1 mounted on a thick film alumina hybrid substrate or chip carrier 2. The cell 1 is shown in exploded view in FIG. 2.

Figure 2:
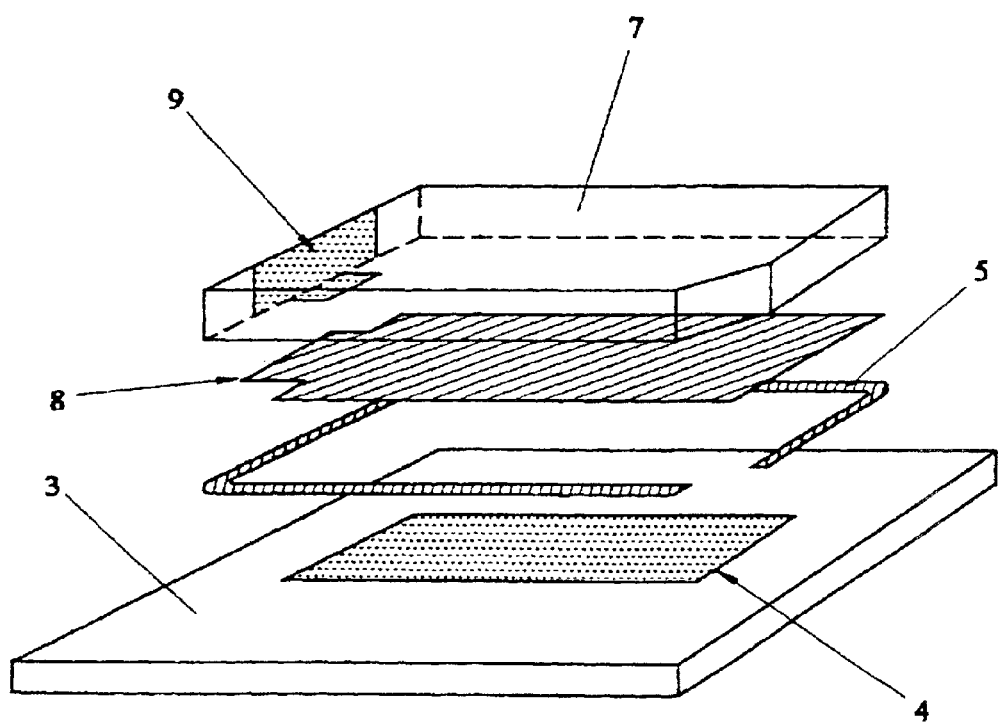
FIG. 2 is an exploded view of components of the liquid crystal cell of FIG. 1.

Cell 1 comprises an active silicon backplane 3 in which a central region is formed to provide an array 4 of active mirror pixel elements arranged in 320 columns and 240 rows. Outside the array, but spaced from the edges of the backplane 3, is a peripheral glue seal 5, which seals the backplane 3 to the peripheral region of a front electrode 6. FIG. 2 shows that the glue seal is broken to permit insertion of the liquid crystal material into the assembled cell, after which the seal is completed, either by more of the same glue, or by any other suitable material or means known per se.

Front electrode 6 comprises a generally rectangular planar glass or silica substrate 7 coated on the substrate underside, facing the backplane 3, with a continuous electrically conducting silk screened indium-tin oxide layer 8. On one edge side of the substrate 7 is provided an evaporated aluminum edge contact 9, which extends round the edge of the substrate and over a portion of the layer 8, thereby providing an electrical connection to the layer 8 in the assembled cell 1.

Insulating spacers 25 formed on the silicon substrate of the backplane 3 extend upwards to locate the front electrode 6 a predetermined, precise and stable distance from the silicon substrate, and liquid crystal material fills the space so defined. As described later, the spacers 25 and the backplane 3 are formed on the silicon substrate simultaneously with formation of the elements of the active backplane thereon, using all or at least some of the same steps.

Figure 3:
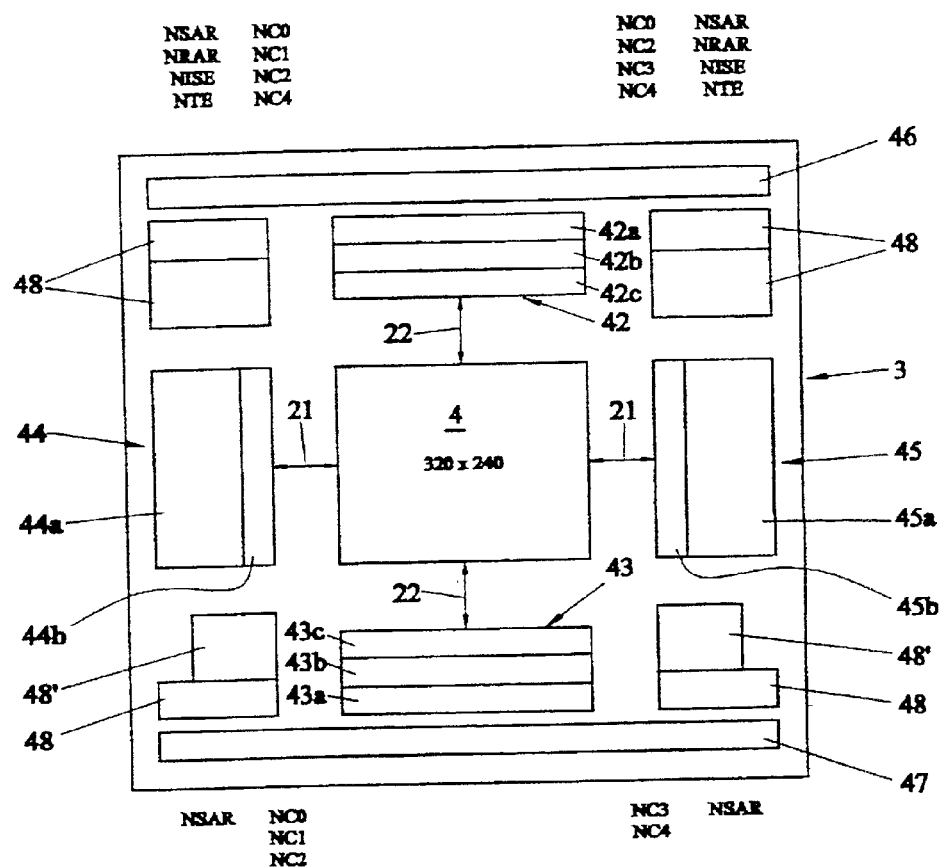
FIG. 3 is a schematic plan view (floorplan) of the active backplane of the liquid crystal cell of FIG. 1, including a central pixel array.

FIG. 3 shows a general schematic view of the layout ("floorplan") of the active backplane 3. As will be described in detail later with reference to FIGS. 4 to 8, each one of the central array 4 of pixel active elements is composed essentially of an NMOS transistor having a gate connected to one of a set of a row conductors, a drain electrode connected to one of a set of column conductors and a source electrode or region which either is in the form of a mirror electrode or is connected to a mirror electrode. Together with an opposed portion of the common front electrode 6 and interposed chiral smectic liquid crystal material 20, the rear located mirror electrode forms a liquid crystal pixel cell which has capacitive characteristics.

Even and odd row conductors are connected to respective scanners 44, 45 spaced either side of the array. Each scanner comprises a level shifter 44b, 45b interposed between a shift register 44a, 45a and the array. In use, a token signal is passed along the registers to enable (render the associated transistors conductive) individual rows in turn, and by suitable control of the registers different types of scan, e.g. interlaced or non-interlaced, can be performed as desired.

Even and odd columns conductors are connected to respective drivers 42, 43 spaced from the top and bottom of the array. Each driver comprises a 32 to 160 demultiplexer 42a, 43a feeding latches 42b, 43b, and a level shifter 42c, 43c between the latches and the column conductors. In use, under the control of a 5-phase clock, data from the memory 24 for successive sets of 32 odd or even column conductors is passed from sets of edge bonding pads 46, 47 to the demultiplexers 42a, 43a, and latched at 42b, 43b before being level shifted at 42c, 43c for supply as a driving voltage to the column conductors. Synchronisation between the row scanning and column driving ensures that the appropriate data driving voltage is applied via the enabled transistors of a row to the liquid crystal pixels, and for this purpose various control circuits 48 and test circuits 48' are provided.

Subsequent disabling of that row places the transistors in a high impedance state so that charges corresponding to the data are then maintained on the capacitive liquid crystal pixels for an extended period, until the row is again addressed.

The gaps 21 between the level shifters 44b, 45b and the adjacent edges of the array 4 are 1 mm wide, and the gaps 22 between the level shifters 44b, 45b and the adjacent edges of the array 4 are 2 mm wide. These gaps, or glue lanes, are sufficiently large to completely accommodate a glue seal 5 of approximate width of 300 microns while allowing for tolerances in positioning of the seal. As shown in FIG. 1, the size of the front electrode 6 sufficient to cover only the array and most of the glue lanes. In the embodiment the array is 11 mm by 8 mm, and the front electrode is 12.4 mm by 9.4 mm.

Figure 4:
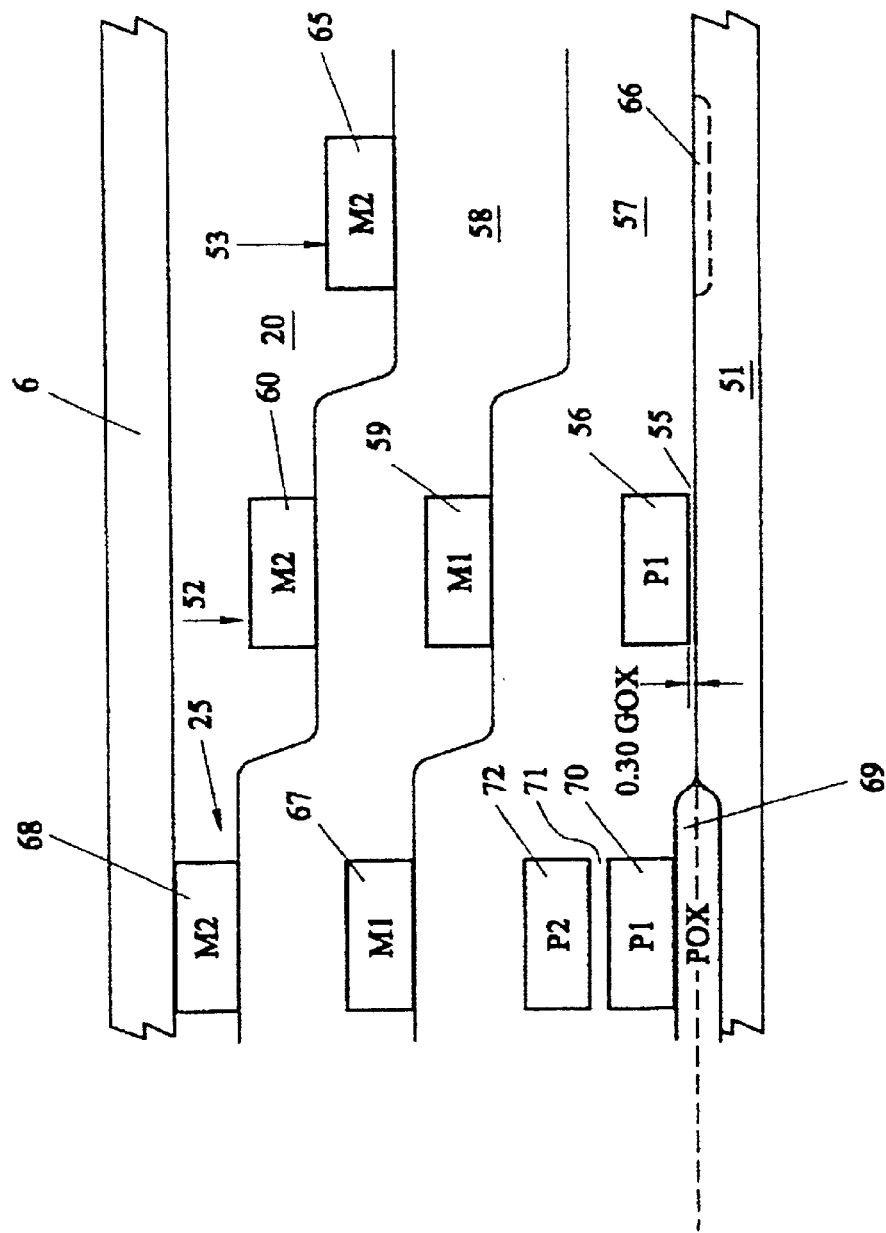
FIG. 4 is a schematic cross sectional view of part of the backplane of FIG. 3 to illustrate the various layers and heights encountered in the region of the pixel array.
Figure 5:
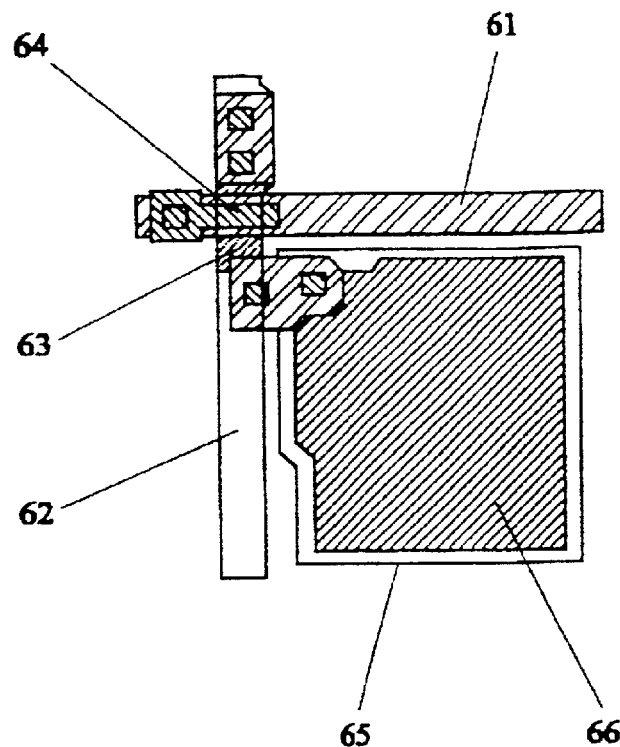
FIG. 5 is a schematic plan view of a single pixel of the array of the backplane of FIG. 4.

As schematically illustrated in FIG. 4, the active backplane is based on a p-type silicon substrate 51. In the region of the array 4 it includes NMOS transistors 52, pixel mirrors 53 and the insulating spacer columns 25, and the substrate 51 is covered first by a lower substantially continuous silicon oxide layer 57 and then by an upper substantially continuous silicon oxide layer 58. It should be noted that FIG. 4 is included merely to illustrate the different heights encountered in the backplane and that the other spatial arrangements of the elements do not correspond to what is found in practice. FIG. 5 shows a plan view of an actual arrangement of transistor and mirror electrode, generally similar to that of FIG. 4, but with the column 25 not shown. Transistors 52 are the highest part of the circuitry itself.

In addition to these layers, the transistor 52 is further defined by a metallic gate electrode 59 on the layer 57 and a metallic drain electrode 60 on layer 58. Electrodes 59 and 60 are portions of a row conductor 61 and a column conductor 62 respectively (see FIG. 5). At the transistor 52, the layer 57 is modified to include a polysilicon region 56 spaced from the substrate 51 by a very thin gate oxide layer 55.

The transistor source is in the form of a large diffusion region 63 within the layer 58 which is connected to electrode 65 of the pixel mirror 53, with the gate region 64 being located essentially under the crossover region of the column and row conductors 61, 62 to maximise the fill factor and to protect it from incident light.

The pixel mirror is formed by the pixel electrode 65 on layer 58, which electrode is of the same metal as, and formed simultaneously with, the drain electrode 60. Beneath most of the mirror electrode 65 there is formed an n-type depletion region 66 in the substrate 51. In the assembled device, the pixel electrodes are spaced from the opposed front electrode 6 by somewhat less that 2 microns with smectic liquid crystal material 20 interposed.

The pixel mirror is essentially flat, since there are no underlying discrete circuit elements, and occupies a proportion (fill factor) of around 65% of the pixel area. The need to maximise the fill factor is one consideration in the decision to employ a DRAM type backplane, rather than the SRAM type in which more space needs to be devoted to the two transistors and their associated elements.

The insulating column or pillar 25 which is associated with each pixel extends above the topology of the rest of the backplane, but is also composed of the layers 57, 58 over the substrate 51, with a first metal film 67 between the layers 57, 58 and a second metal film 68 between layer 58 and (in use) the front electrode 22. First and second metal films 67, 68 are of the same metals, and deposited at the same time, as the electrodes 59, 60 of the transistor 52. In the region of the spacer, the substrate is modified to provide a field oxide layer 69, and the bottom of layer 57 is modified to provide two polysilicon layers 70, 72 spaced by a thin oxide layer 71.

Although it includes metallic layers, the spacer provides good insulation between the front electrode and the active backplane. By forming insulating spacers in this manner, it is possible to locate them accurately relative to other elements on the backplane, thereby avoiding any interference with optical or electrical properties. By creating them at the same time as the active and other elements of the backplane, using the same processes, there are advantages in terms of cost and efficiency.

As mentioned above, a pixel cell thus formed has capacitance. Chiral smectic liquid crystal materials are ferroelectric, so that application of an electric field sufficient to cause realignment of the molecules is associated with an additional transfer of charge. This effect is associated with a time constant insofar as the liquid crystal material takes time to realign.

The requirement for charge to flow during realignment, and the associated time constant, have a number of consequences. In particular, while the realignment can be relatively fast, it may still be much less than is required for fast scanning of the device.

With a SRAM type backplane, the state of a pixel is retained until the next address, and with power being supplied from a bus current can be supplied until realignment has been completed. However, with a DRAM type backplane, power is supplied to each pixel only during the addressing period. The capacitance of the cell is relatively small, and cannot retain sufficient charge for realignment to be completed.

One way of dealing with this problem is to provide each pixel with an additional "slug" capacitance which is quickly charged when the pixel is addressed, its charge thereafter being consumed as the liquid crystal molecules realign and subsequent pixels are being addressed. Thus the slug capacitance effectively avoids the need for an addressing pulse as long as the realignment time.

Figure 6:
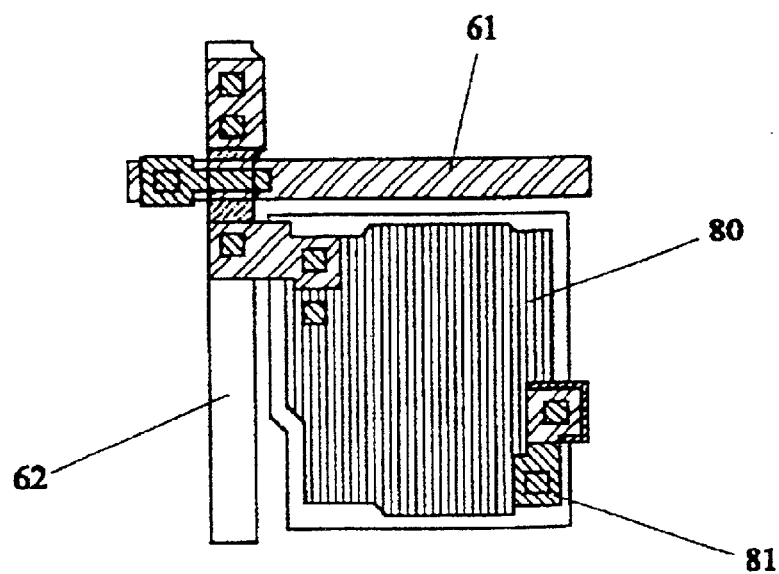
FIGS. 6 to 8 show modifications of FIG. 5.

In FIG. 5, the diffusion layer 66 forms in use a reverse biassed diode, the depletion region of which acts as the slug capacitance. FIG. 6 shows a variant in which the depletion layer 66 is substituted by a parallel plate capacitor formed between two polysilicon regions 80 (similar to regions 70 and 72 in the insulating column of FIG. 5, and preferably formed therewith). The lower polysilicon region is connected to the substrate 51 by a space consuming metal strap 81, so that while this arrangement has a similar capacitance to the reverse biassed diode, it significantly reduces the fill factor of the mirror electrode and for this reason is not preferred.

The smectic liquid crystal used in the embodiment has a monostable alignment, so that for the DRAM type pixel element to remain in the switched state until it is next addressed, it is essential to limit charge leakage. In a sense, the fact that there is an additional charge displacement during realignment is helpful, in that the amount of charge leakage to permit relaxation to the original state is relatively large.

Unlike a conventional encapsulated computer DRAM, illuminating light can penetrate to the backplane. If it reaches sensitive elements, photoconductivity can permit relaxation of the pixel in less time than the scanning period, and this should not be allowed to happen. Steps therefore need to be taken (a) to reduce light penetration to sensitive elements as far as possible; and (b) to alleviate the effects of any light which nevertheless still penetrates.

In FIGS. 4 to 6, step (a) is implemented insofar as the transistor 52, and particularly its gate region, is located substantially beneath metallic conductors 60, 61 and in that the diode provided by region 66, which is especially photosensitive, is largely hidden by the mirror layer 65. However, there are still gaps which allow light to penetrate directly or indirectly.

As implied above, there is particular concern relating to the diode region. There is less concern when the slug capacitance is of the general form indicated in FIG. 8 but this has a lower fill factor.

Figure 7:
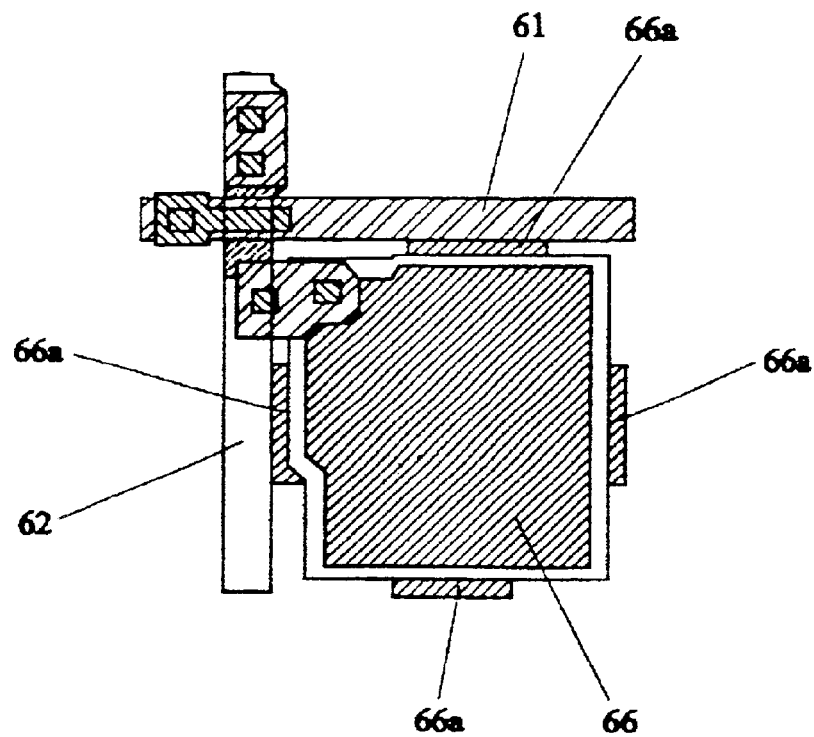

FIG. 7 shows a modification of the arrangement of FIG. 5 in which n-type charge trapping implants 66a are formed in exposed areas of the silicon substrate adjacent the edges of the pixel mirror 53, thus preventing photo-induced carriers from entering the depletion region 66.

Figure 8:
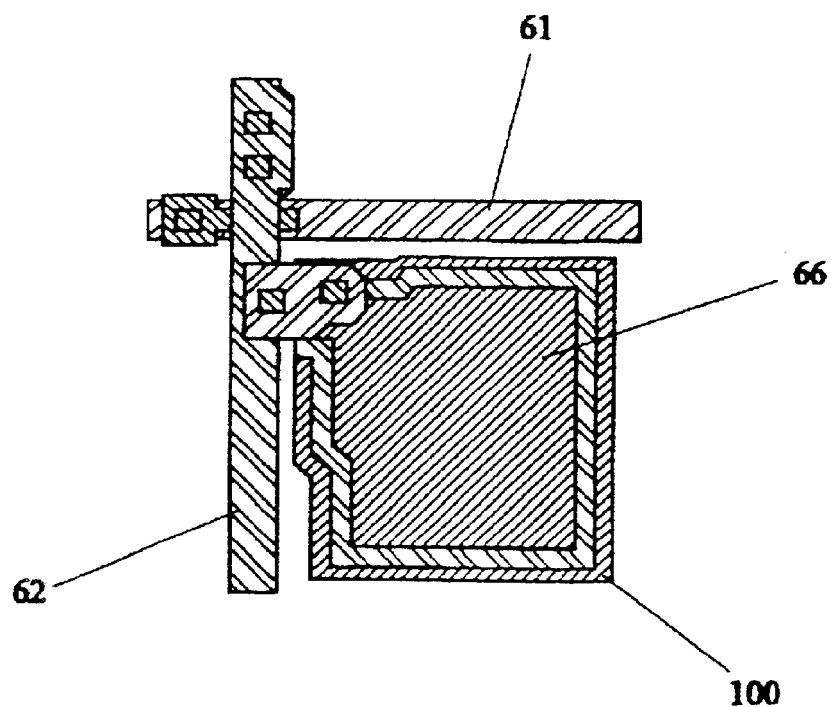

FIG. 8 illustrates an alternative modification in which an n-type guard ring 100 is formed on the peripheral region of the diffusion region 66. While this is more effective than the arrangement of FIG. 6, it also reduces the slug capacitance to a greater degree.

While the fill factor of 65% in the arrangements of FIGS. 1 to 5 is sufficiently high to be acceptable, the reflectivity of the mirror electrode is not optimised, since the material thereof is identical to that used in producing the active elements of the backplane.

It is normal semiconductor foundry practice to supply backplanes with a continuous top insulating layer deposited over the entire plane, and to produce the arrangements of the preceding Figures, it would be necessary to remove this insulating layer, or to avoid having it applied in the first place.

However, by the use of partial or full planarisation of the backplane, the fill factor and reflectivity of the mirror electrode can be increased.

In partial planarisation the top insulating layer is retained, but with vias extending to underlying electrode pads 65, which can be small as they no longer function as mirrors. A respective highly reflective mirror coating (normally not the material used in fabricating the active elements of the backplane) is deposited over the majority of the pixel area and is connected to its via.

This construction has advantages, inter alia, of a high fill factor, greater than 65%, commonly at least 80%, and possibly up to 90% or more; a highly reflective mirror electrode; and reduced light penetration to the underlying semiconductor material. While it is preferred to retain the insulating columns (and similarly constructed ridges in the glue lanes 21, 22) to support and space the front electrode relative to the backplane, so reducing the fill factor slightly, these now include the additional top insulating layer. The only post-foundry step is the deposition of the reflective mirror material. It should be noted that the latter is not as flat as previously, owing to the underlying structure of the backplane.

Full planarisation is a known process in which the topology of the backplane is effectively removed by filling with a insulating material, e.g. a polymer. Again, this may be implemented on the present backplane, with or without the top insulating layer introduced at the foundry, and with very flat highly reflective mirror electrodes deposited over each pixel with a high fill factor. However, although the product has the same advantages as partial planarisation, and may be superior in performance, its production by present technologies involves a number of post-foundry steps, some not easily or efficiently performed (such as ensuring the flatness of the insulating material), and so is not preferred at the moment.

The chiral smectic liquid crystal material is given a desired surface alignment at one or both substrates by means known per se. In the case of the active semiconductor backplane, treatment will be of the partial or full planarisation layer if provided.

It should be understood that although the embodiment is described in relation to a chiral smectic liquid crystal spatial light modulator, this invention in relates to any semiconductor backplane construction, and particularly to any such construction suitable for use in an electrically operable light modulator.

What is claimed is:

1. A semiconductor active backplane comprising a semiconductor substrate including an array of addressable active elements and first electrodes, wherein said addressable elements are electrically connected to respective first electrodes of said array such that said first electrodes of the array can be selectively energised, wherein at least part of the region beneath at least one of said first electrodes is formed as a depletion region whereby in use it acts as a reverse biassed capacitative diode wherein at least one charge trapping implant is provided adjacent but spaced from said depletion region.

2. A semiconductor active backplane according to claim 1 wherein there is a single active element at each location of the array provided by a single transistor.

3. A semiconductor active backplane according to claim 1 wherein the active element(s) have a MOS construction.

4. A semiconductor active backplane according to claim 1 wherein substantially the whole of each active element is covered by a metallic conductor, or a pair of metallic conductors.

5. A backplane according to claim 1 wherein the array of active elements is covered by an insulating layer, each said active element being connected to a metal electrode on said insulating layer, the array of said metal electrodes thus formed covering more than 65% of the area of said array.

6. A backplane according to any claim 5 wherein the said array of said metal electrodes covers more than 80% of the area of said array of addressable active elements.

7. A semiconductor active backplane comprising a semiconductor substrate including an array of addressable active elements and first electrodes, wherein said addressable elements are electrically connected to respective first electrodes of said array such that said first electrodes of the array can be selectively energised, wherein at least part of the region beneath at least one of said first electrodes is formed as a depletion region whereby in use it acts as a reverse biassed capacitative diode wherein a guard ring is provided over or around the periphery of said depletion region to prevent or hinder charge carriers from crossing between the depletion region and the rest of the substrate.

8. A backplane according to claim 7 wherein the array of active elements is covered by an insulating layer, each said active element being connected to a metal electrode on said insulating layer, the array of said metal electrodes thus formed covering more than 65% of the area of said array.

9. A semiconductor active backplane according to claim 7, wherein there is a single active element at each location of the array provided by a single transistor.

10. A semiconductor active backplane according to claim 7, wherein the active elements are comprised of a MOS construction.

11. A semiconductor active backplane according to claim 7, wherein substantially the whole of each active element is covered by at least one metallic conductor.

12. A semiconductor active backplane comprising a semiconductor substrate including an array of addressable active elements and first electrodes, wherein said addressable elements are electrically connected to respective first electrodes of said array such that said first electrodes of said array can be selectively energised, wherein the semiconductor substrate further comprises first and second orthogonal sets of addressing conductors, a respective pair of addressing conductors, one from each set, being associated with the addressing of a corresponding active element, wherein substantially the whole of each active element is covered by at least one of said addressing conductors in the form of a metallic conductor.

13. A backplane according to claim 12 wherein the array of active elements is covered by an insulating layer, each said active element being connected to a metal electrode on said insulating layer, the array of said metal electrodes thus formed covering more than 65% of the area of said array.

14. A semiconductor active backplane comprising a semiconductor substrate including an array of addressable active elements and first electrodes, wherein said addressable elements are electrically connected to respective first electrodes of said array such that said first electrodes of said array can be selectively energised, wherein the semiconductor substrate further comprises first and second orthogonal sets of addressing conductors, a respective pair of addressing conductors, one from each set, being associated with the addressing of a corresponding active element, characterised in that substantially the whole of each element is covered by said pair of addressing conductors in the form of metallic conductors.

15. A backplane according to claim 14 wherein the array of active elements is covered by an insulating layer, each said active element being connected to a metal electrode on said insulating layer, the array of said metal electrodes thus formed covering more than 65% of the area of said array.

* * * * *

UNITED STATES PATENT AND TRADEMARK OFFICE
CERTIFICATE OF CORRECTION

PATENT NO. : 6,812,909 B1
DATED : November 2, 2004
INVENTOR(S) : Crossland et al.

It is certified that error appears in the above-identified patent and that said Letters Patent is hereby corrected as shown below:

Title page,
Item [75], Inventor, second inventor, -- Tat C.B. Yu, Cambridge (GB) -- should be inserted Signed and Sealed this Nineteenth Day of April, 2005

JON W. DUDAS
*Director of the United States Patent and Trademark Office*